Dec. 13, 1927.
S. KRAUS
1,652,784
DEVICE FOR PREVENTING FREEZING OF DRAIN PIPES
Filed April 18, 1927
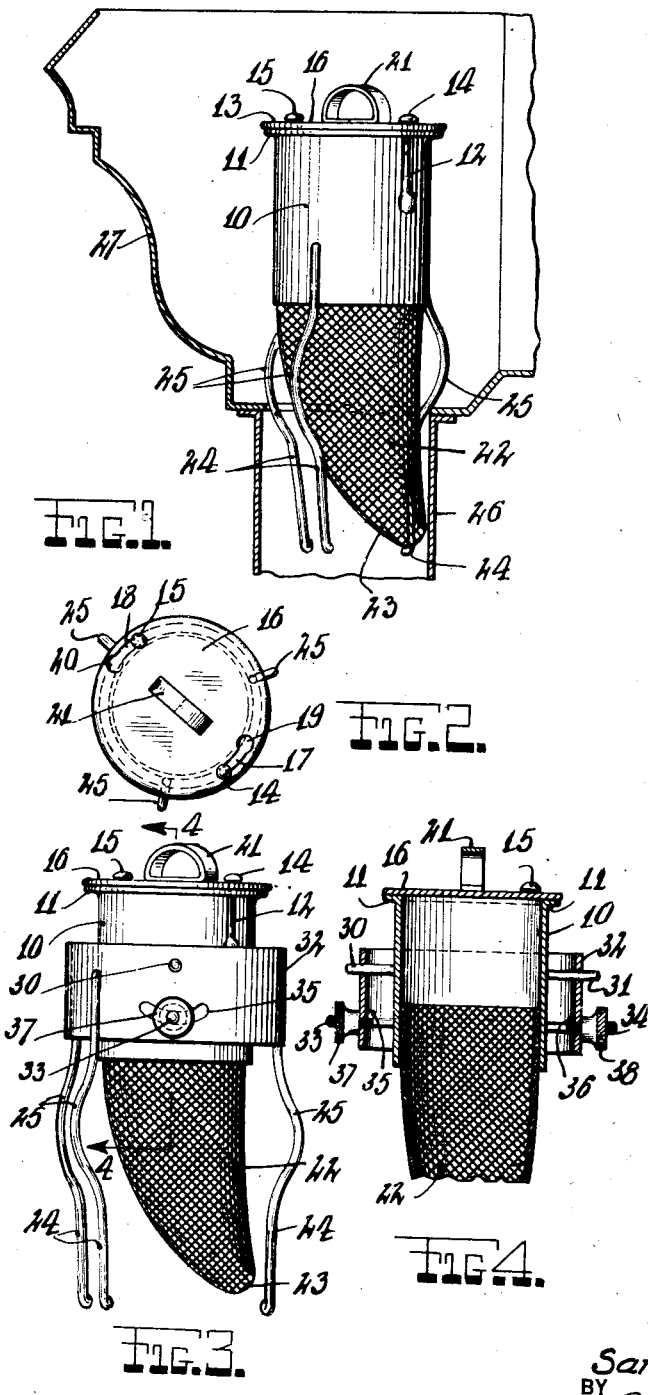
INVENTOR
Samuel Kraus
BY
ATTORNEY Patented Dec. 13, 1927.

1,652,784

UNITED STATES PATENT OFFICE.

SAMUEL KRAUS, OF NEW YORK, N. Y.

DEVICE FOR PREVENTING FREEZING OF DRAIN PIPES.

Application filed April 18, 1927. Serial No. 184,607.

This invention relates to a new and useful device in the nature of a receptacle particularly adapted for use in connection with leaders or drain pipes on the roofs of buildings, said receptacle adapted to contain rock salt, or the like, as a means of preventing water from freezing in the leader or drain pipe which would restrict the flow of water through the leader or drain pipe.

The object of the invention is to provide a receptacle of novel construction and arrangement of parts, hereinafter more fully described, claimed, and illustrated in the accompanying drawing.

Fig. 1 is a side elevational view of my improved device attached to a leader or drain pipe, as same would appear when in use.

Fig. 2 is a top plan view of my improved device.

Fig. 3 is a side elevational view illustrating a further development of my improved device.

Fig. 4 is a central vertical sectional view taken on the line 4—4 of Fig. 3.

As here embodied my improved device comprises a tubular member 10, provided with an upper flanged element 11. The pins 12 and 13, are attached to the outer portion of the tubular member 10, and extended upwardly therefrom, through apertures formed in the flanged element 11. The pins 12 and 13, are provided with enlarged heads 14 and 15 respectively. The cover 16, of circular disc shaped construction, is adapted to cover or enclose the upper open extremity of the tubular member 10. The cover 16, is provided with coaxial elongated apertures 17 and 18, having enlarged recesses 19 and 20 respectively. The cover 16, has attached thereto, a handle 21. The above described construction is such as will permit the enlarged heads 14 and 15 of the pins 12 and 13, to be inserted through the enlarged recesses 19 and 20, respectively, so as to permit the cover 16 to be slightly rotated, as a means of removably attaching the cover 16 to the tubular member 10.

The conical member 22, preferably of wire mesh, wire screen, or the like, is attached to the lower portion of the tubular member 10, and is extended therefrom, and is formed or shaped so as to permit its apex 23, to extend to one side thereof, as clearly shown in Fig. 1, of the accompanying drawing. The tubular member 10, and the conical member 22, are adapted to hold rock salt, or any similar ingredient adapted to prevent water from freezing.

The clip members 24, are attached to the lower portion of the tubular member 10 and are extended downwardly therefrom, and are provided with intermediate outwardly formed elements 25, adapted to engage the inner surface of the leader 26, or drain pipe, as a means of removably holding my improved device in place in the leader 26, at the upper portion thereof, adjacent to the gutter 27, to which the leader 26 is attached. The two latter mentioned elements are of ordinary construction, such as generally used on the roofs of buildings to convey the water from the roof to a drain, sewer, or the like. It is understood that the apex 23 of the conical member 22, is to be positioned in contact with the leader 26, so as to permit water running down the leader 26 to come in contact with the rock salt in my improved device, so as to prevent the water from freezing.

In Figs. 3 and 4, of the accompanying drawing, I have shown the tubular member 10, pivotally attached as at 30 and 31, to the collar member 32, of tubular construction. The threaded members 33 and 34, are attached to and extended from the tubular member 10 and are extended through coaxial elongated apertures 35 and 36, respectively, formed in the collar member 32. The lock nuts 37 and 38 are threadedly attached to the threaded members 33 and 34, respectively. The above described construction is such as will permit the conical member 22, to be pivoted, as may be required, so as to allow the apex 23, to contact the leader 26, for the purpose as above set forth.

The above described construction is such as will permit my improved device to be attached to the outlet box or the edge of the roof and positioned directly in front of the aperture 51 of the inside of the outlet box. The outer side of the outlet box is directly above the leader head 49, of the leader 50, or drain pipe.

Having thus described my invention, what I claim as new and desire to protect by Letters Patent of the United States is as follows:

1. In a device of the class described, a tubular member pivotally attached to a collar member, threaded members attached to and extended from the said tubular member and extended through coaxial apertures formed in the said collar member, lock nuts threadedly attached to the said threaded members.

2. A device for preventing freezing of drain pipes, comprising a collar member provided with clip members for engagement with a drain pipe, a tubular member pivotally supported within the collar member, the tubular member being provided with a cover and a screen member approximately conical, forming a receptacle for antifreezing ingredients, such as rock salt, and means for securing the tubular member in tilted relation to the collar member.

In testimony whereof I have affixed my signature.

SAMUEL KRAUS.